United States Patent [19]

Zucker et al.

[11] Patent Number: 5,202,874
[45] Date of Patent: Apr. 13, 1993

[54] CIRCUIT ARRANGEMENT FOR IDENTIFYING THE TYPE OF AN OPTICAL RECORD CARRIER

[75] Inventors: Friedhelm Zucker, Mönchweiler; Christian Büchler, Marbach, both of Fed. Rep. of Germany

[73] Assignee: Deutsche Thomson-Brandt GmbH, Hanover, Fed. Rep. of Germany

[21] Appl. No.: 688,957

[22] PCT Filed: Nov. 17, 1988

[86] PCT No.: PCT/EP89/01390
§ 371 Date: Jun. 21, 1991
§ 102(e) Date: Jun. 21, 1991

[87] PCT Pub. No.: WO90/05977
PCT Pub. Date: May 31, 1990

[30] Foreign Application Priority Data

Nov. 17, 1988 [DE] Fed. Rep. of Germany ....... 3838859

[51] Int. Cl.$^5$ ..................... G11B 7/00; G11B 11/10; G11B 19/12
[52] U.S. Cl. ..................... 369/54; 369/48; 369/13
[58] Field of Search .............. 369/58, 53, 54, 47, 369/50, 124, 48, 13; 360/114, 59

[56] References Cited

U.S. PATENT DOCUMENTS 4,509,155 4/1985 Masuda et al. ..................... 369/48
4,688,203 8/1987 Koishi et al. ..................... 369/48

FOREIGN PATENT DOCUMENTS 0251557 12/1985 Japan .
0042751 3/1986 Japan .
0158055 7/1986 Japan .
0180935 8/1986 Japan .
0237247 10/1986 Japan .
0076061 4/1987 Japan .
0029371 2/1988 Japan .
0076116 4/1988 Japan .

OTHER PUBLICATIONS

IBM Technical Disclosure Bulletin vol. 29 No. 3 Aug. 1986.

*Primary Examiner*—Aristotelis Psitos
*Assistant Examiner*—Thang V. Tran
*Attorney, Agent, or Firm*—Max Fogiel

[57] ABSTRACT

A circuit arrangement for detecting and recognizing the type of optical recording medium being scanned, in which a high pass filter is connected in series with a rectifier. The high pass filter receives a data signal containing information stored in the recording medium. A low pass filter has an input which receives also the data signal. The first input of a comparator is connected to the output of the rectifier, whereas the rectifier has an input connected to the output of the high pass filter. A second input of the comparator is connected to an output of the low pass filter, and a controls processor is connected to an output of the comparator. A second comparator may be provided with a first input connected to the output of the rectifier, whereas the second input of the second comparator is connected to a reference voltage. The output of this second comparator is also connected to the controls processor which recognizes the type of recording medium being scanned from the outputs of the comparators.

7 Claims, 2 Drawing Sheets

CIRCUIT ARRANGEMENT FOR IDENTIFYING THE TYPE OF AN OPTICAL RECORD CARRIER

BACKGROUND OF THE INVENTION

The invention concerns circuitry detecting what type an optically recorded medium is.

One known type of optically recorded medium is the compact disk (CD). Behind a transparent layer it has a reflecting layer of aluminum with depressions called pits or grooves that represent information stored on the disk. An optical pick-up can read the information on the disk because the reflectivity of the aluminum depends on the pattern of pits. Less light will, due to destructive interference, be reflected from a pit than from an unpressed area, called land.

From the intensity of the light reflected from the disk, accordingly, the pick-up can tell whether the bit it is focused on is a logical ONE or a logical ZERO.

Another type of optically recorded medium is the magneto-optical disk described in the article Magnetooptische Versuche dauern an ["Magneto-optical testing continues"], Funkschau 13 (6/20/1986), 37–41.

In contrast to CD's, magneto-optical disks have no pits. Behind the transparent layer is a magneto-optical layer that information can be stored in and read from. How information is stored on a magneto-optical disk will now be explained.

A laser beam focused on the disk heats the magneto-optical layer to a temperature in the vicinity of its Curie point.

It is usually sufficient to heat the layer to approximately its compensation point, which is below the Curie point. Behind the focal point on the disk is an electromagnet that magnetizes the area heated by the laser beam in one or the other direction. When the laser beam is turned off, the heated area will cool to below the compensation point again, and the magnetic direction established by the elecromagnet will be retained, "freezing in." Individual bits are accordingly stored in domains of different magnetic direction, one corresponding to a logical ONE and the other to a logical ZERO.

The data are read out by exploiting the Kerr effect. The plane of polarization of a linearly polarized beam of light is rotated at a measurable angle when the beam if reflected by a magnetized mirror The plane will be rotated right or left depending on the mirror's direction of magnetization. Since, however, the individual domains on the disk act like magnetized mirrors, the plane of polarization of any beam scanning the disk will be rotated right or left at a measurable angle.

From the rotation of the plane of polarization of the beam of light reflected from the disk, an optical pick-up can determine whether the bit being scanned is a ONE or a ZERO. In contrast to a CD with its pits, a magneto-optical disk can be erased and recorded on again almost as often as desired.

German Patent Application P 3 732 875.1 discloses a magneto-optical recorded medium with information stored both in a magnetic layer and in pits.

German Patent Application P 3 732 874.3 describes a pick-up that can read information from a CD, from a magneto-optical disk, and from the combination CD and magneto-optical disk disclosed in Application 3 732 875.1.

To obtain the information stored in the pits, the light reflected from or shining through the disk is deflected to at least two photodetectors. The data signal is generated by adding the output signals from the two detectors.

The information stored in the magnetic layer is converted to electric signals by separating with a polarizing splitter the light reflected from or shining through the disk into two beams. The beams's planes of polarization are rotated in opposite directions in accordance with the Kerr effect. One beam, with its plane rotated in one direction, is deflected to one photodetector and the other, with its plane rotated in the other direction, to another photodetector. A data signal representing the information stored in the magnetic layer is constructed from the difference between the signals from the two detectors.

The same two detectors can be employed to obtain the information stored in both the pits and the magnetic layer from the light reflected from or shining through the disk. In one case it is the sum of and in the other the difference between their output signals that is constructed.

Since the optical pick-up known from German Patent Application P 3 732 874.3 can be used to read information from a CD, from a magneto-optical disk, and from the combination CD and magneto-optical disk disclosed in Application 3 732 875.1, it will make it easier for the user if the equipment can automatically detect what type of disk is inserted in it.

SUMMARY OF THE INVENTION

It is accordingly the object of the invention to provide circuitry that will automatically detect what type an optically recorded medium is.

This object is attained in accordance with the invention in that the data signal that represents the information stored in the pits is forwarded through a high pass in series with a rectifier to one input terminal and through a low pass to the other input terminal of a comparator, the output terminal of which is connected to a controls processor.

DESCRIPTION OF THE PREFERRED EMBODIMENTS

The invention will now be described with reference to the embodiment illustrated in FIG. 1 and its function explained with reference to the signals illustrated in FIG. 2.

Figure 1:
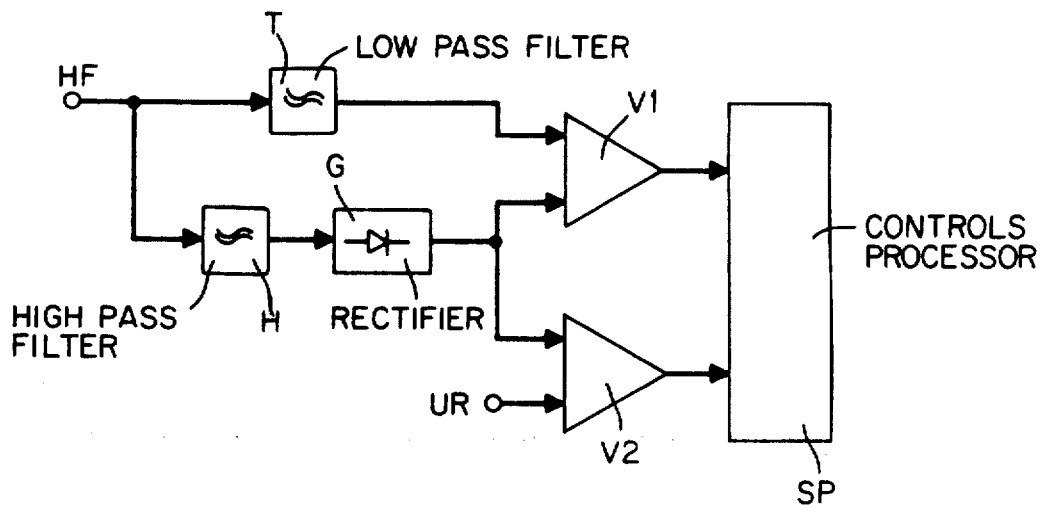
FIG. 1 illustrates one embodiment of the invention.

The data signal HF representing the information stored in the pits is forwarded as illustrated in FIG. 1 through a series comprising a high pass H and a rectifier G to one input terminal of a comparator V1 and V2 and through a low pass to the second input terminal of comparator V1. AT the second input terminal of comparator V2 is a reference voltage UR. The output terminals of comparators V1 and V2 are connected to a controls processor SP.

Figure 2:
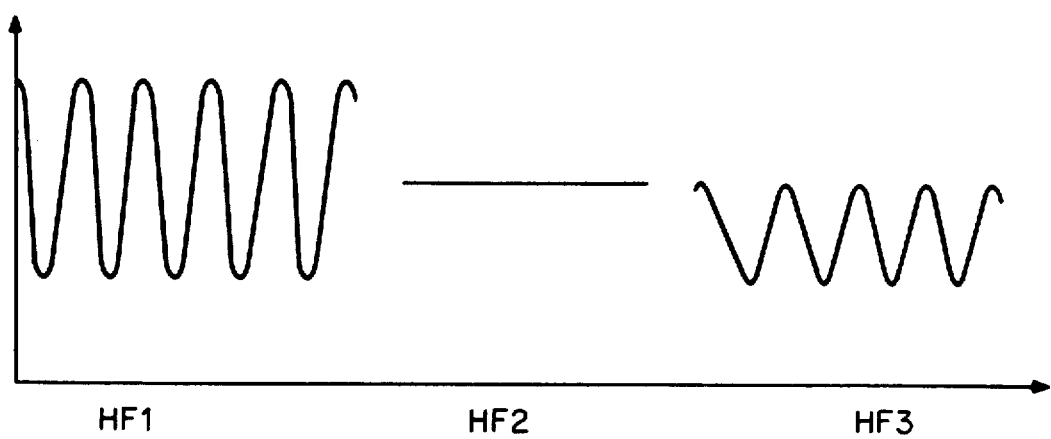
FIG. 2 data signals from various recorded media.
Figure 3:
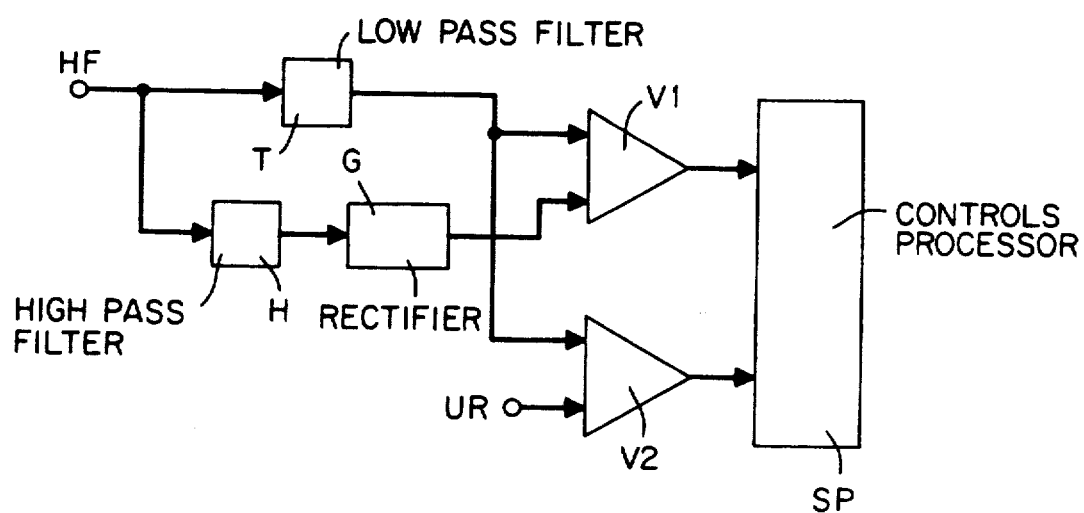
FIG. 3 is a schematic diagram and shows another embodiment of the invention that is illustrated in FIG. 1.

FIG. 2 illustrates a data signal HF1 from a CD, a data signal HF2 from a magneto-optical disk, and a data signal HF3 from a combination of both.

The data signal HF1 from the CD, on which information is stored in pits, is a high-frequency signal with a mean that approximates a flat level. Since there are no pits on a magneto-optical disk, the intensity of the light reflected from or shining through the disk is always approximately equal, and the data signal HF2 constructed from the sum of the output signals from the two photodetectors will be approximately flat.

The sum of the output signals from the two photodetectors associated with the recorded medium known from German Patent Application P 3 732 875.1 is also a high-frequency signal, although its amplitude is less than that associated with a CD because the difference between the intensity of the reflected and penetrating light is lower due to the shallower pits.

When there is a CD in the equipment, data signal HF1 is a high-frequency signal with a flat component superimposed over it. The level at the first input terminal of comparator V1 will accordingly be higher than that at the second input terminal and higher than reference voltage UR. From the output signals of comparators V1 and V2, which may in this case have high levels for example, controls processor SP will recognize that the inserted disk is a CD.

If, now, the combination optical and magneto-optical recorded medium known from Application P 3 732 875.1 is inserted in the equipment, data signal HF3 will also be a high-frequency signal with a flat component superimposed over it, although its amplitude will be less than that of a CD. The level at the first input terminal of comparator V1 will accordingly be higher than that at its second input terminal, and reference voltage UR will be high enough to ensure that the level at the first input terminal of comparator V2 will be lower than the reference voltage UR at its second input terminal with this type of disk. From the output signal of comparator V1, which has the higher level, and from the output signal of comparator V2, which has the lower level, controls processor SP will recognize that a disk like that described in Application P 3 732 875.1 is in the equipment.

When a magneto-optical disk is to be read, data signal HF2 will have no high-frequency components. Since it is a flat signal, the levels at the first input terminals of comparators V1 and V2 will be approximately zero. Since the level at the second input terminal of comparator V1 is now higher, however, than that at its first input terminal, comparator V1 will emit a signal with a lower level from its output terminal. Controls processor SP will accordingly recognize that the user has selected a magneto-optical disk. The signal at the output terminal of comparator V2 plays no part in this decision and can be either HIGH or LOW.

Another embodiment differs from the first only in that the first input terminal of second comparator V2 is connected not to the output terminal of rectifier G but to the output terminal of low pass T.

A CD or magneto-optical disk will be recognized by the second embodiment in exactly the same way as by the first embodiment. If the disk is of the type described in Application P 3 732 875.1, it is the superimposed flat component and not the rectified high-frequency component of data signal HF3 that is compared with reference voltage UR in comparator V2.

As already mentioned herein, data signal HF3 is a high-frequency signal with a superimposed flat component but with an amplitude less than that of a CD. The level at the first input terminal of comparator V1 will accordingly be higher than that at its second input terminal. Reference voltage UR, however, will be high enough to ensure that for this disk the level at the first input terminal of comparator V2 will be lower than the reference voltage UR at its second input terminal. From the output signal of comparator V1, which has the higher level, and from the output signal of comparator V2, which has the lower level, controls processor SP will recognize that a disk like that described in Application P 3 732 875.1 is in the equipment.

We claim:

1. A circuit arrangement for detecting and recognizing a type of optical recording medium comprising: a high pass filter connected in series with a rectifier, said high pass filter receiving a data signal having information stored in said recording medium; a low pass filter having an input receiving also said data signal; and comparator having a first input connected to an output of said rectifier, said rectifier having an input connected to an output of said high pass filter; said comparator having a second input connected to an output of said low pass filter; and a controls processor connected to an output of said comparator; a second comparator with a first input connected to the output of said rectifier; said second comparator having a second input connected to a source of reference voltage; said second comparator having an output connected to said controls processor; said controls processor recognizing said recording medium to be a compact disk when said first input of said first comparator has a voltage level exceeding the voltage level at said second input of said first comparator and exceeding also said reference voltage; said controls processor recognizing said recording medium to be a combination optical and magneto-optical recording medium when the voltage level at said first input of said first comparator exceeds the voltage level of the second input of said first comparator and the voltage level of said first input of said second comparator is below said reference voltage at the second input of said second comparator so that said first comparator has an output voltage exceeding the output voltage of said second comparator; said controls processor recognizing said recording medium to be a magneto-optical disk when the voltage level at the first input of both said first comparator and said second comparator is substantially zero and the second input of said first comparator has a voltage level exceeding the first input of said first comparator so that recognition of said magneto-optical disk of based only on the output voltage of said first comparator and independent of the output voltage of said second comparator.

2. A circuit arrangement for detecting and recognizing a type of optical recording medium comprising: a high pass filter connected in series with a rectifier, said high pass filter receiving a data signal having information stored in said recording medium; a low pass filter having an input receiving also said data signal; a comparator having a first input connected to an output of said rectifier, said rectifier having an input connected to an output of said high pass filter; said comparator having a second input connected to an output of said low pass filter; and a controls processor connected to an output of said comparator; said controls processor recognizing said recording medium to be a magneto-optical disc when said second input of said comparator has a voltage level exceeding said first input of said comparator.

3. A circuit arrangement as defined in claim 2, wherein said comparator comprises a first comparator; a second comparator with a first input connected to the output of said rectifier; said second comparator having a second input connected to a source of reference voltage; said second comparator having an output connected to said controls processor; said controls processor recognizing said recording medium to be a compact disc when said first input of said first comparator has a voltage level exceeding the voltage level at said second input of said first comparator and exceeding also said reference voltage; said controls processor recognizing said recording medium to be a combination optical and magneto-optical recording medium when the voltage level at said first input of said first comparator exceeds the voltage level of the second input of said first comparator and the voltage level of said first input of said second comparator is below said reference voltage at the second input of said second comparator so that said first comparator has an output voltage exceeding the output voltage of said second comparator.

4. A circuit arrangement as defined in claim 2, wherein said comparator comprises a first comparator; a second comparator with a first input connected to the output of said output of said low pass filter; said second comparator having a second input connected to a source of reference voltage; said second comparator having an output connected to said controls processor; said controls processor recognizing said recording medium to be a compact disc when said first input of said first comparator has a voltage level exceeding the voltage level at said second input of said first comparator and exceeding also said reference voltage; said controls processor recognizing said recording medium to be a combination optical and magneto-optical recording medium when the voltage level at said first input of said first comparator exceed the voltage level of the second input of said first comparator and the voltage level of said first input of said second comparator is below said reference voltage at the second input of said second comparator so that said first comparator has an output voltage exceeding the output voltage of said second comparator.

5. A circuit arrangement in an optical playback device having an optical scanner reading data from an optical and magneto-optical recording medium and producing respective optical and magneto-optical data signal, comprising: a high pass filter connected in series with a rectifier, said high pass filter receiving said data signal stored in pits of said recording medium; a low pass filter having an input receiving also said data signal; a comparator having a first input connected to an output of said rectifier, said rectifier having an input connected to an output of said high pass filter; said comparator having a second input connected to an output of said low pass filter; and a controls processor connected to an output of said comparator, said control processor recognizing from a voltage level of the output of said comparator whether or not said recording medium is a magneto-optical recording medium; said controls processor recognizing said recording medium to be a magneto-optical disc when the second input of said comparator has a voltage level exceeding the first input of said comparator.

6. A circuit arrangement as defined in claim 5, wherein said comparator comprises a first comparator; a second comparator with a first input connected to the output of said rectifier; said second comparator having a second input connected to a source of reference voltage; said second comparator having an output connected to said controls processor, said controls processor recognizing from a voltage level of the output of said second comparator whether or not said recording medium is a magneto-optical recording medium; and whether said recording medium is an optical recording medium or a combination of an optical and a magneto-optical recording medium; said controls processor recognizing said recording medium to be a compact disc when said first input of said first comparator has a voltage level exceeding the voltage level at said second input of said first comparator and exceeding also said reference voltage; said controls processor recognizing said recording medium to be a combination optical and magneto-optical recording medium when the voltage level at said first input of said first comparator exceeds the voltage level of the second input of said first comparator and the voltage level of said first input of said second comparator is below said reference voltage at the second input of said second comparator so that said first comparator has an output voltage exceeding the output voltage of said second comparator.

7. A circuit arrangement as defined in claim 5, wherein said comparator comprises a first comparator; including a second comparator with a first input connected to the output of said low pass filter; said second comparator having a second input connected to a source of reference voltage; said second comparator having an output connected to said controls processor; said controls processor recognizing from a voltage level of the output of the said second comparator whether or not said recording medium is a magneto-optical recording medium, whether said recording medium is an optical recording medium or a combination of an optical and a magneto-optical recording medium; said controls processor recognizing said recording medium to be a compact disc when said first input of said first comparator has a voltage level exceeding the voltage level at said second input of said first comparator and exceeding also said reference voltage; said controls processor recognizing said recording medium to be a combination optical and magneto-optical recording medium when the voltage level at said first input of said first comparator exceeds the voltage level of the second input of said first comparator level of said first input of said second comparator is below said reference voltage at the second input of said second comparator so that said first comparator has an output voltage exceeding the output voltage of said second comparator.

* * * * *